(12) United States Patent
Brindisi et al.

(10) Patent No.: US 11,424,603 B2
(45) Date of Patent: Aug. 23, 2022

(54) MODULAR ELECTRICAL WIRING DEVICE ASSEMBLIES

(71) Applicant: Pass & Seymour, Inc., Syracuse, NY (US)

(72) Inventors: Alec J. Brindisi, Syracuse, NY (US); Richard M. Rohmer, Memphis, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 431 days.

(21) Appl. No.: 16/705,908

(22) Filed: Dec. 6, 2019

(65) Prior Publication Data

US 2020/0185898 A1   Jun. 11, 2020

Related U.S. Application Data

(60) Provisional application No. 62/776,637, filed on Dec. 7, 2018, provisional application No. 62/804,070, filed on Feb. 11, 2019.

(51) Int. Cl.
| | |
|---|---|
| *H01R 25/00* | (2006.01) |
| *H02G 3/12* | (2006.01) |
| *H01H 71/24* | (2006.01) |

(52) U.S. Cl.
CPC .............. *H02G 3/12* (2013.01); *H01H 71/24* (2013.01); *H01R 25/006* (2013.01); *H01H 2219/036* (2013.01)

(58) Field of Classification Search
CPC .......... H02G 3/12; H02G 3/18; H01R 25/006
USPC .......................................................... 174/66
See application file for complete search history.

(56) References Cited

U.S. PATENT DOCUMENTS

| | | | | | |
|---|---|---|---|---|---|
| 5,041,698 | A | * | 8/1991 | Takagi ..................... | H02G 3/14 174/66 |
| 5,457,286 | A | * | 10/1995 | Flasz ........................ | H02G 3/14 200/339 |
| 5,879,185 | A | * | 3/1999 | Handler ............... | H01R 25/164 439/538 |
| 6,042,243 | A | * | 3/2000 | Grill ................... | G09F 13/0413 40/605 |
| 6,608,253 | B1 | * | 8/2003 | Rintz ....................... | H01H 9/18 174/67 |
| 8,334,459 | B2 | * | 12/2012 | Chaumeny .............. | H02G 3/14 174/67 |
| 2016/0249477 | A1 | * | 8/2016 | Rohmer ................. | H01H 71/50 |

* cited by examiner

*Primary Examiner* — Sherman Ng
(74) *Attorney, Agent, or Firm* — Bond, Schoeneck & King, PLLC; Frederick Price

(57) ABSTRACT

A modular electrical wiring device assembly including, but not limited to, a frame assembly having a top surface, a bottom surface, a width, a length and a height; a primary opening defined by a primary opening surface, wherein the primary opening is positioned through the top surface and the bottom surface; a cover plate positioned over and in contacting relation to the top surface of the frame assembly, wherein the cover plate includes a cover plate opening positioned over and in line with the primary opening; and a modular electrical wiring device positioned through the cover plate opening and the primary opening, wherein a portion of the modular electrical wiring device is positioned below the bottom surface of the frame assembly.

21 Claims, 11 Drawing Sheets

MODULAR ELECTRICAL WIRING DEVICE ASSEMBLIES

CROSS-REFERENCE TO RELATED APPLICATION

The present application claims priority to and the benefit of U.S. Provisional Patent Application No. 62/776,637, filed on Dec. 7, 2018, and of U.S. Provisional Patent Application No. 62/804,070, filed on Feb. 11, 2019, each of which is hereby incorporated by reference herein in its respective entirety.

BACKGROUND OF THE INVENTION

1. Field of the Invention

The present invention relates generally to electrical wiring devices, and more particularly to modular electrical wiring device (e.g., electromechanical switch, dimmer, and outlet device) assemblies, and portions thereof, including a frame assembly with a primary opening and a secondary opening upon and/or within/through which at least a respective portion of a modular electrical wiring device can be positioned (with or without at least one modular alignment element/conductor), and a removable/replaceable wall plate/aesthetic cover.

2. Description of the Related Art

Modular electrical wiring devices that fit upon a frame or within a frame opening are known. Such a modular device assembly is shown and described, for example, in U.S. Pat. No. 8,946,576 (see, e.g., FIGS. 4A-14; see also U.S. Pat. No. 9,095,053). For example, the modular device of U.S. Pat. No. 8,946,576 is shown positioned through a frame in FIGS. 15A-17, and in conjunction with a wall plate in FIGS. 18-19. Additional background information on the frame and modular alignment connectors can be found, for example, in U.S. Pat. No. 8,946,576 at FIGS. 2A-3D, and a heat sink in FIGS. 15A-17. Such modular electrical wiring device assemblies can protrude a certain distance away from the face of a wall after installation, due to the thickness of the assembly as measured from about the frame member up to the face of the aesthetic cover as shown, for example, in FIG. 16 of U.S. Pat. No. 8,946,576, especially when a separator or sub-plate member is used (see also FIGS. 1A and 1B in this disclosure, showing an exploded perspective view and a side assembled view, respectively, of a conventional modular device including frame 10, assembly fasteners (here, screws) 5, modular alignment connectors 20, separator or sub-plate 106 and cover plate 201).

Accordingly, there is a need for a thinner modular electrical wiring device assembly as measured from about the frame member up to the face of the aesthetic cover.

Description of the Related Art Section Disclaimer: To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

BRIEF SUMMARY OF THE INVENTION

It is therefore a principal object and advantage of the present invention to provide a modular electrical wiring device assembly that eliminates one or more of the problems/issues discussed above. In particular, the present disclosure is directed to inventive devices and systems structured and/or configured to allow a thinner modular electrical wiring device assembly as measured from about the frame member up to the face of the aesthetic cover (as compared to conventional devices/assemblies). A particular non-limiting goal of the utilization of the embodiments and implementations herein is to provide a modular electrical wiring device assembly including, but not limited to, a frame assembly including a primary opening in the frame, a modular electrical wiring device that can be positionable upon, within, and/or through the frame/opening in the frame (with or without at least one modular alignment element/conductor), a secondary frame opening that allows the modular electrical wiring device to sit deeper/lower within the primary frame opening (as compared to conventional devices/assemblies), and a removable/replaceable wall plate/aesthetic cover.

In accordance with a preferred embodiment, there is no separator or sub-plate as is shown in conventional devices (as described above and shown in FIGS. 1A-B), so such a portion no longer sticks out from the wall after assembly and installation (as is the case with conventional assemblies). In addition, a portion of the user accessible housing (which is a top housing portion above the main body of the modular electrical wiring device and can include a switch, slider and/or electrical outlet apertures (including for example, USB or other DC type ports), as should be understood by a person of ordinary skill in the art in conjunction with a review of this disclosure) can be positioned at least below the top surface of the frame, and can be positioned below the bottom surface of the frame.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Each non-photographic figure provided and referenced herein includes line drawings, which are numbered, and exact copy color drawings (on the same page) for clarity.

Certain structural and functional aspects of embodiments of the present invention are similar to embodiments of the protective wiring device described and illustrated in U.S. Pat. Nos. 8,946,576 and 9,095,053. Those similarities should be understood by a person of ordinary skill in the art in conjunction with a review of this disclosure and accompanying drawings in conjunction with the patent, and are not further discussed in detail herein. Certain differences, including various inventive features of embodiments of the present invention are further briefly described herein and below with reference to the accompanying drawings.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

Figure 1A:
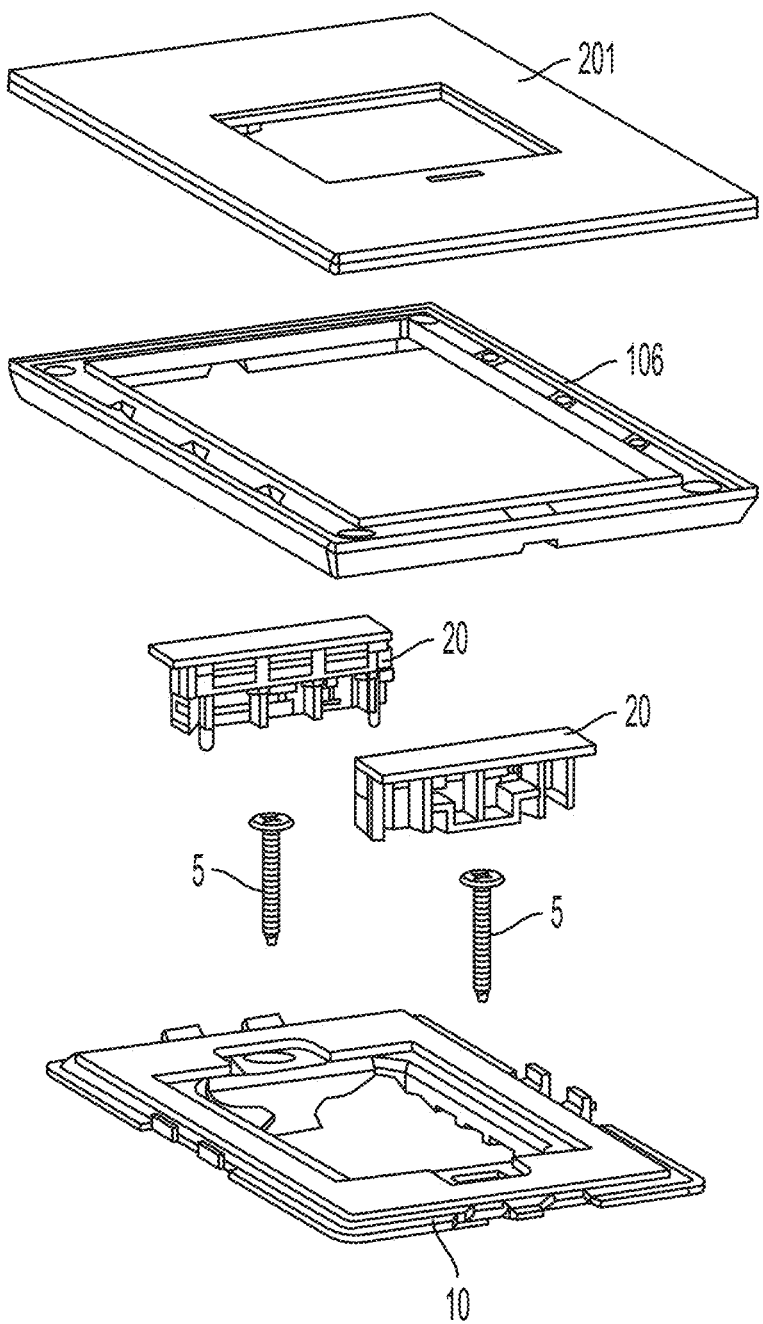
FIG. 1A is an exploded perspective view schematic representation of a conventional frame assembly portion of a modular electrical wiring device assembly.
Figure 1B:
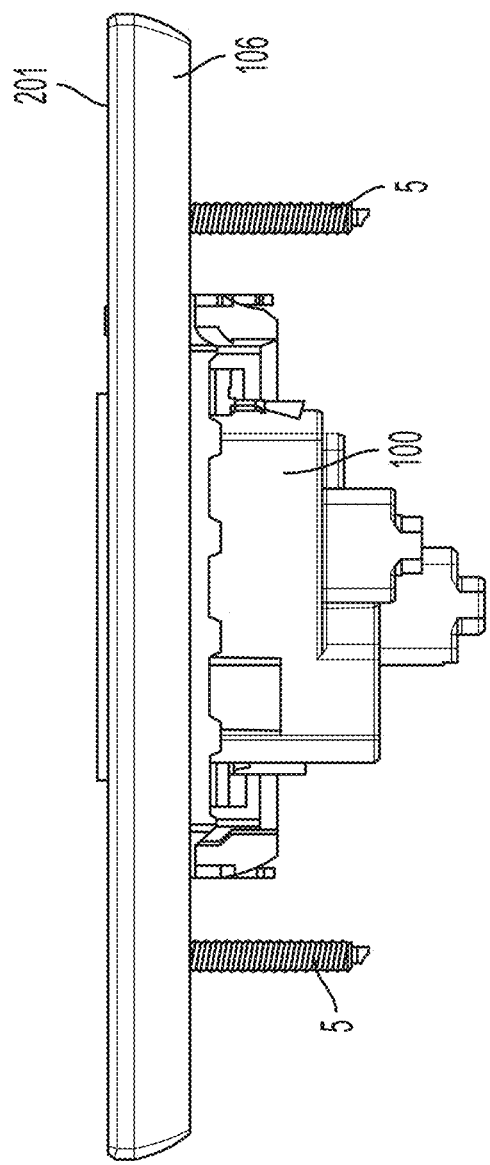
FIG. 1B is a side assembled view schematic representation of a conventional modular electrical wiring device assembly.
Figure 2A:
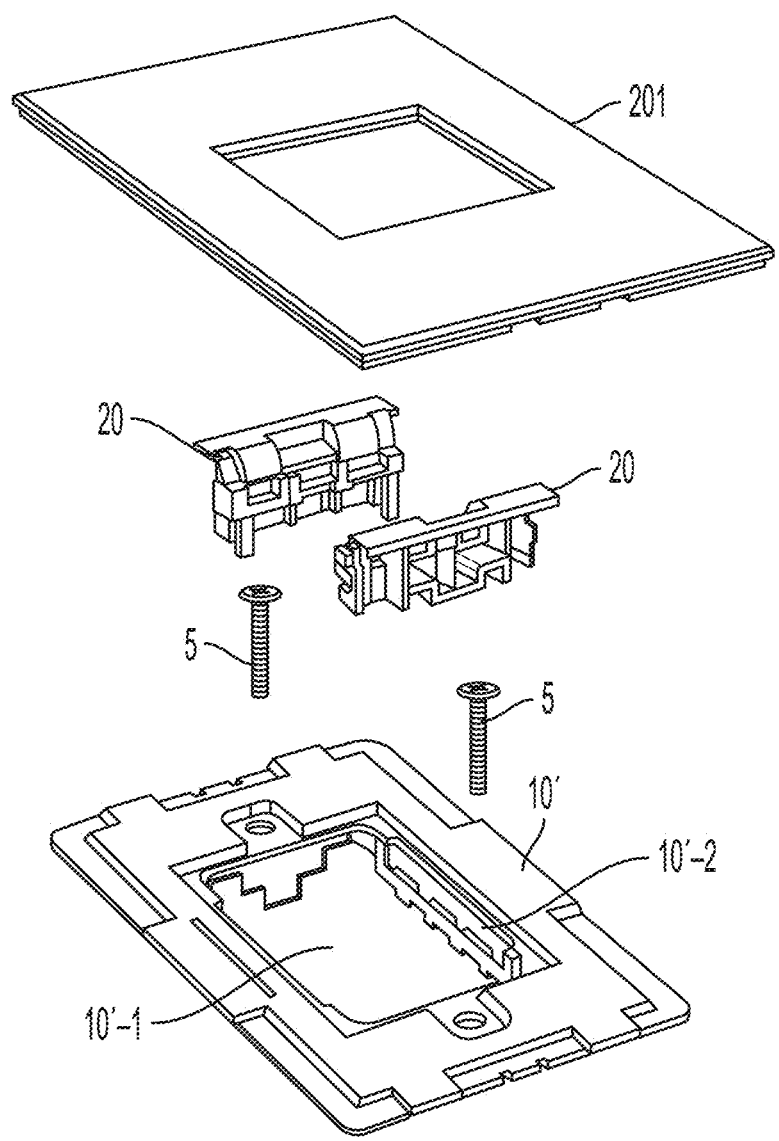
FIG. 2A is an exploded perspective view schematic representation of a frame assembly of a modular electrical wiring device assembly according to an embodiment.

Referring now to FIG. 2A, an exploded perspective view schematic representation of a frame assembly of a modular electrical wiring device assembly according to an embodiment is shown. The frame assembly can include, but is not limited to, a frame 10', a primary opening at least one secondary opening 10'-2 (there can be another secondary opening on the other side of the frame 10' in a similar position), assembly screws 5, modular alignment connectors 20, and cover plate 201. The modular alignment connectors 20 can fit or be fastened/held at least partially within the primary opening 10'-1, and the at least one secondary opening 10'-2 (and can fit or be fastened within a plurality of secondary openings). Notably, there is no separator or sub-plate (or other separator structure) positioned between and preventing contact between the frame 10' and the cover plate 201, as is shown in FIG. 1A, for example, with respect to conventional assemblies.

Figure 2B:
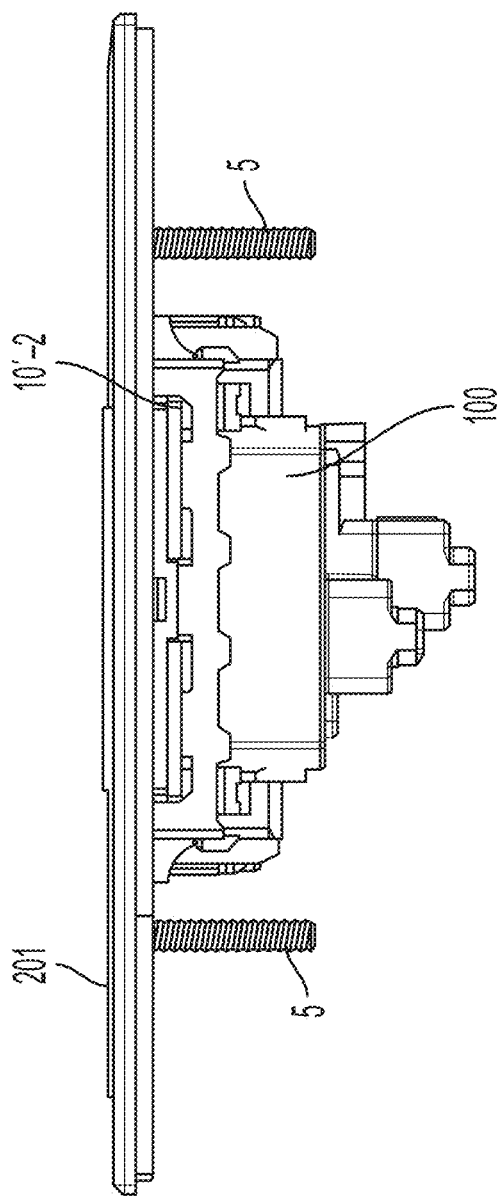
FIG. 2B is an assembled side view of the frame assembly shown in FIG. 2A with a modular electrical wiring device forming a modular electrical wiring device assembly according to an embodiment.

Turning to FIG. 2B, an assembled side view of the frame assembly shown in FIG. 2A with a modular electrical wiring device forming a modular electrical wiring device assembly is shown. In this view, a modular electrical wiring device 100 is shown positioned through primary opening 10'-1, with a portion of the modular electrical wiring device 100 positioned through the secondary opening 10'-2. As should be understood by those of ordinary skill in the art in conjunction with a review of this disclosure, there can be single gang, 2-gang and more than 2-gang versions of the modular electrical wiring device assembly according to an embodiment (see e.g., FIGS. 4A and 4C herein which show a 2-gang version of the assembly, where each successive gang is a duplicate with the same elements and configuration of the other—except for the modular electrical wiring device, which can change).

Figure 2C:
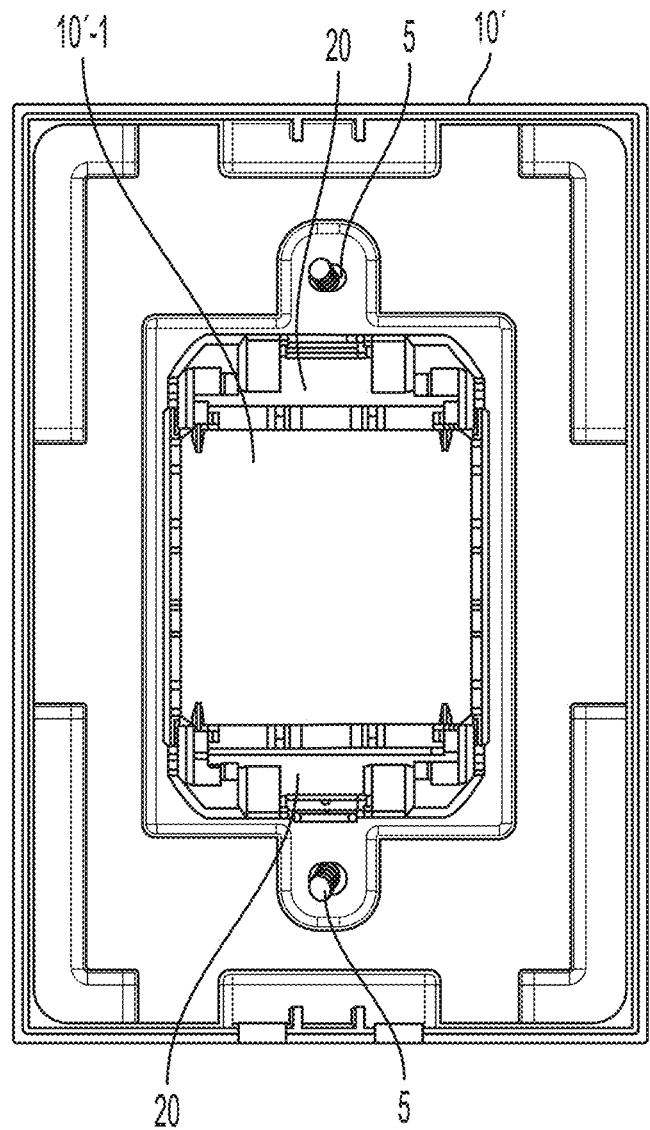
FIG. 2C is a bottom view schematic representation of the frame assembly shown in FIG. 2A according to an embodiment.

Referring to FIG. 2C, a bottom view schematic representation of the frame assembly shown in FIG. 2A is shown. Connectors 20 are shown positioned and secured within the primary opening 10'-1 via screws 5.

Figure 3A:
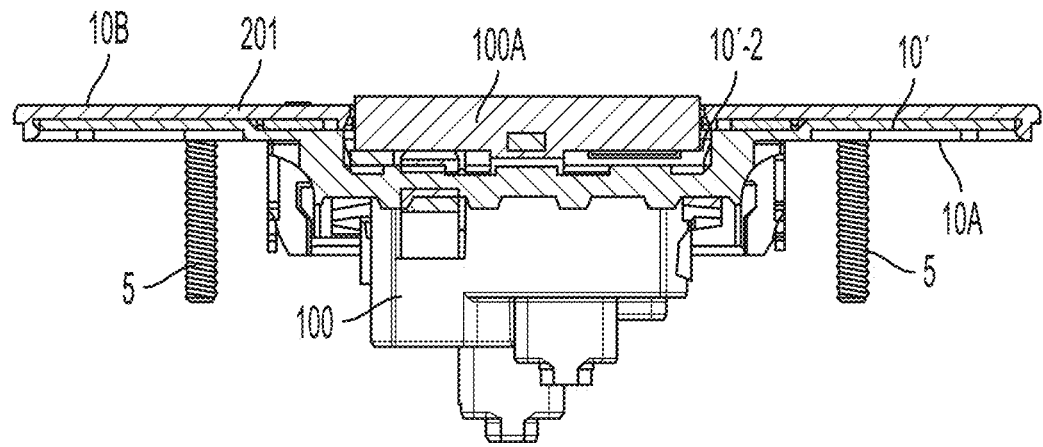
FIG. 3A is a side view of the modular electrical wiring device assembly shown in FIG. 2B according to an embodiment.

Referring to FIG. 3A, an opposite side view of the modular electrical wiring device assembly shown in FIG. 2B according to an embodiment is shown. As shown, a portion of the user accessible housing 100A (which is a top housing portion above the main body of the modular electrical wiring device 100 and can include a switch, slider and/or electrical outlet apertures, as should be understood by a person of ordinary skill in the art in conjunction with a review of this disclosure) is positioned at least below the top surface 10B of the frame 10', and can be positioned below the bottom surface 10A of the frame 10'.

Figure 3B:
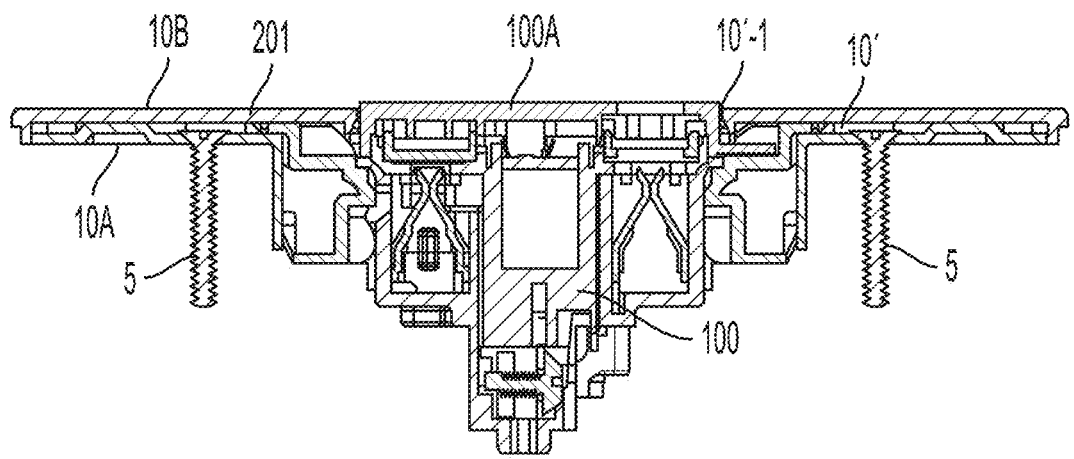
FIG. 3B is a separate sectional side view of the modular electrical wiring device assembly shown in FIG. 3A according to an embodiment.

Referring to FIG. 3B, a separate sectional side view of the modular electrical wiring device assembly shown in FIG. 3A according to an embodiment is shown.

Figure 4A:
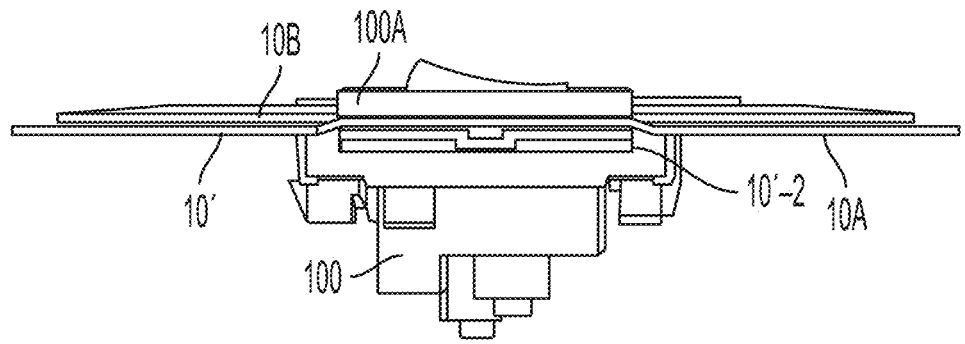
FIG. 4A is a side perspective photographic view of the modular electrical wiring device assembly according to an embodiment.
Figure 4B:
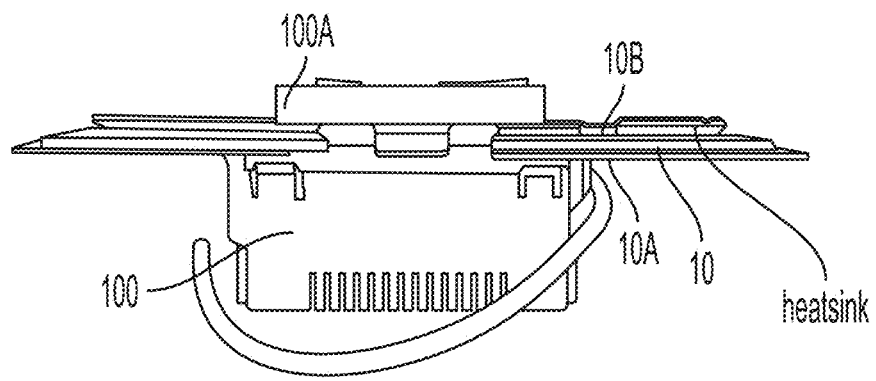
FIG. 4B is a side perspective photographic view of a conventional modular electrical wiring device assembly.

Turning to FIG. 4A, a side perspective photographic view of the modular electrical wiring device assembly is shown according to an embodiment. As shown, the structure of the frame 10'—including the secondary opening 10'-2 that fits a portion of the electrical wiring device (a switch shown here), and the heat sink 102 positioned within primary opening area 10'4 (see FIG. 4C, providing a top perspective photographic view of the modular electrical wiring device assembly of FIG. 4A, which also shows at least one tab that is bendable based on its structure, which is discussed further below)—allows the modular electrical wiring device 100 to sit more shallowly within the frame 10' as compared with the conventional device/assembly and prevents the frame from bending when it gets screwed into a wall box or other similar structure (as should be understood by a person of ordinary skill in the art in conjunction with a review of this disclosure). As shown, a non-whole portion (and, alternatively the whole portion) of the switch user accessible housing 100A is positioned below at least the top surface 10B of the frame 10'. Conversely, as shown in FIG. 4B, a side perspective photographic view of a conventional modular electrical wiring device assembly is shown with a switch user accessible housing 100A that sits completely above the top surface 10B of the frame 10, with the heat sink not being primary positioned within an opening area and pushing the switch up (see FIG. 4D, providing a top perspective photographic view of the conventional modular electrical wiring device assembly of FIG. 4B).

Figure 4C:
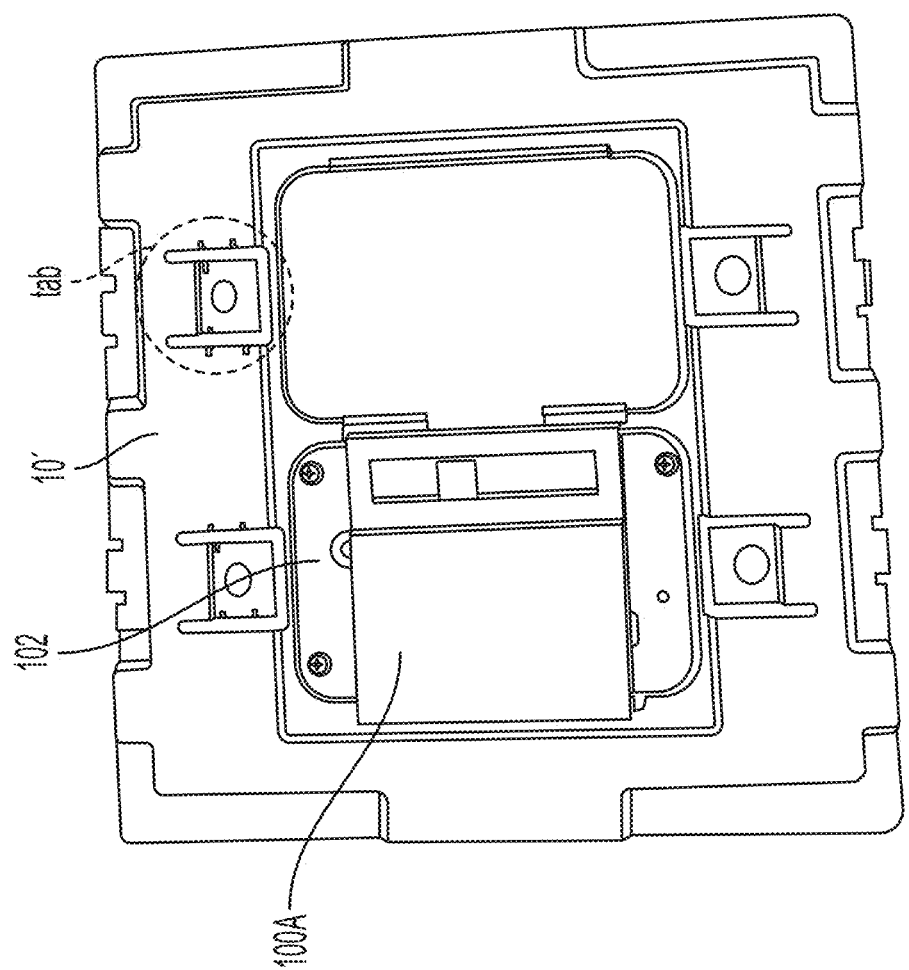
FIG. 4C is a top perspective photographic view of the modular electrical wiring device assembly of FIG. 4A according to an embodiment.
Figure 4D:
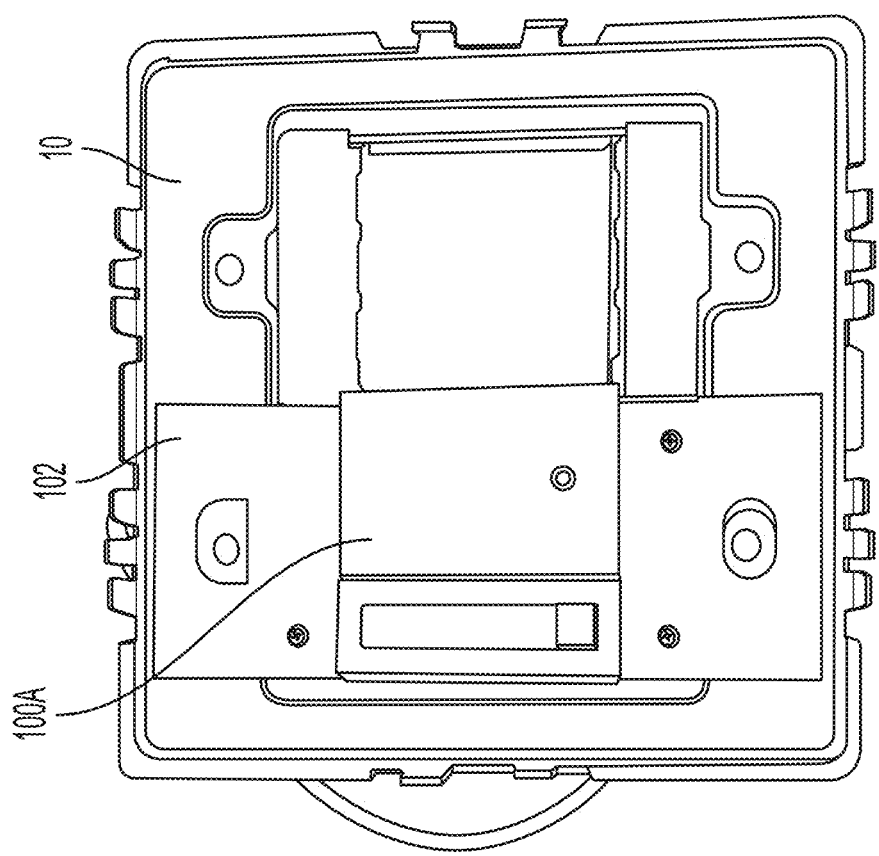
FIG. 4D is a top perspective photographic view of the conventional modular electrical wiring device assembly of FIG. 4B.
Figure 5A:
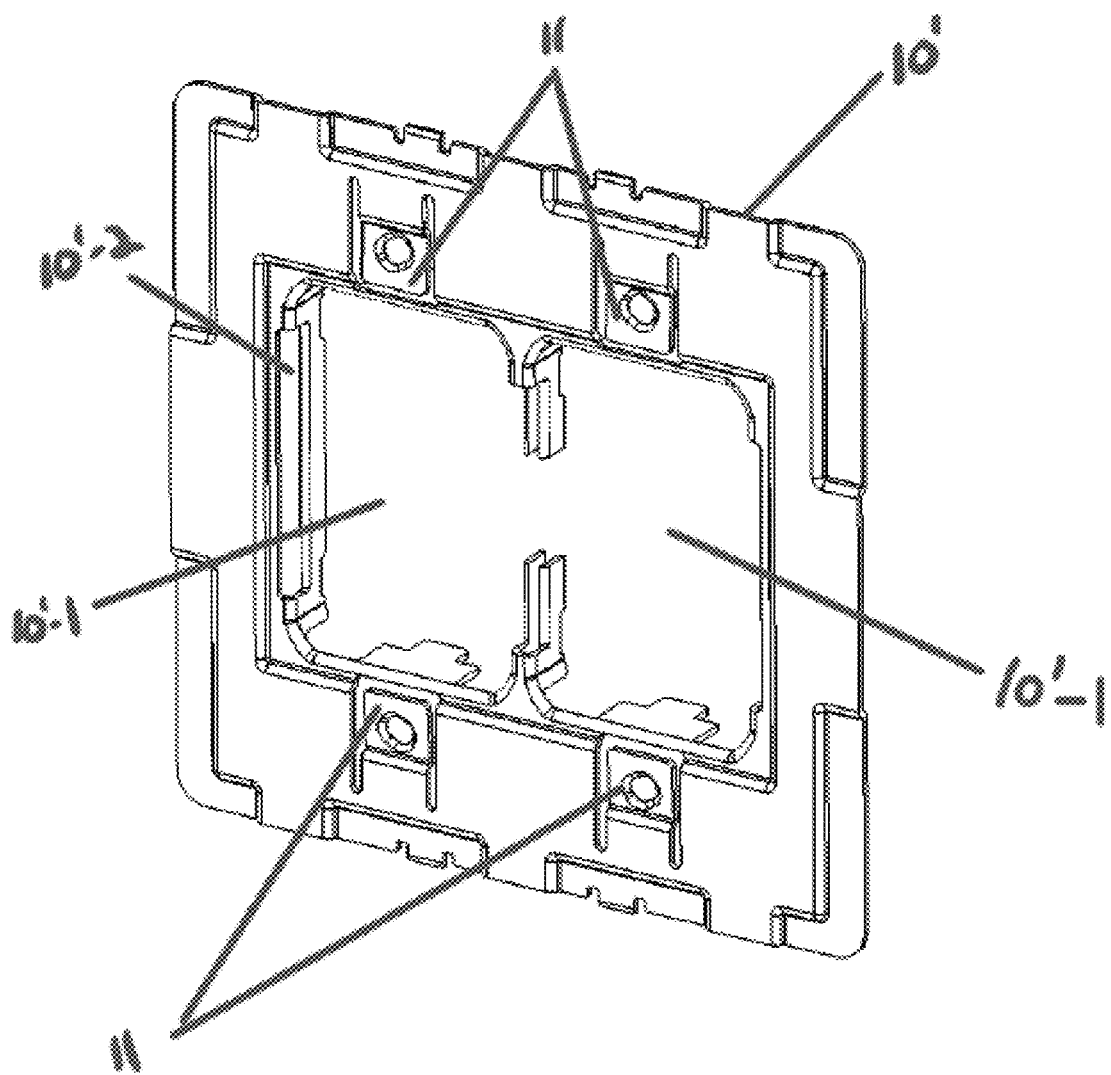
FIG. 5A is a perspective view schematic representation of a 2-gang frame assembly of a modular electrical wiring device assembly according to an embodiment.
Figure 5B:
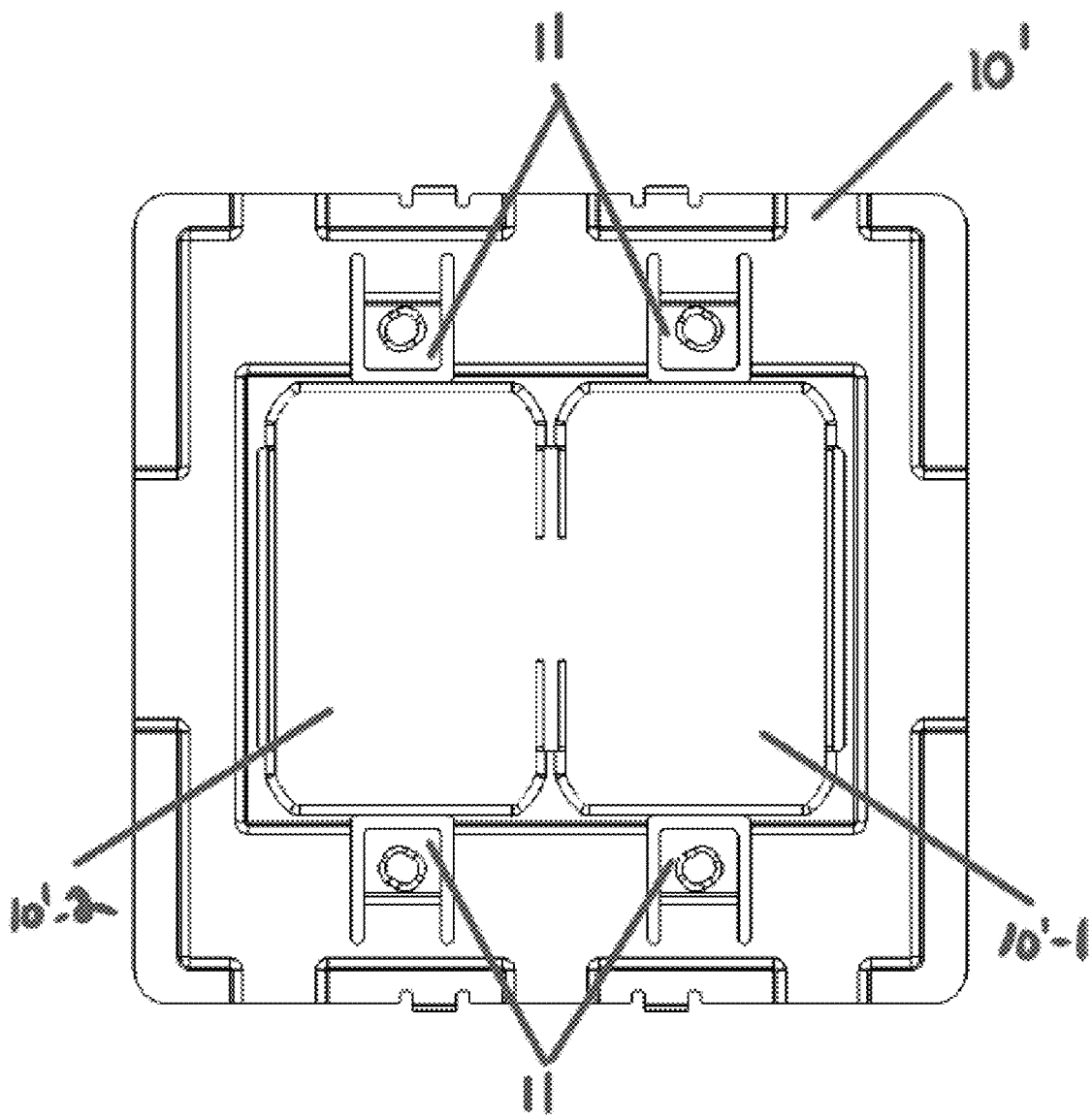
FIG. 5B is a top view schematic representation of a 2-gang frame assembly of a modular electrical wiring device assembly shown in FIG. 5A according to an embodiment.

Turning to FIG. 5A, a perspective view schematic representation of a 2-gang frame assembly of a modular electrical wiring device assembly according to an embodiment is shown. FIG. 5B is a top view schematic representation of a 2-gang frame assembly of a modular electrical wiring device assembly shown in FIG. 5A according to an embodiment. Two primary opening areas 10'-1, two secondary openings 10'-2, and four tabs 11—through which fasteners including screws or other attachment means are positioned to secure the modular electrical wiring device assembly to a box or other wall structure (as should be understood by a person of ordinary skill in the art in conjunction with this disclosure)—are also shown (similar tabs are also shown in FIG. 4C). This illustrated embodiment, which can include a single gang or a multiple gang structure (as should be appreciated by those of skill in the art in conjunction with a review of this disclosure), is directed to a bend resistant frame 10' with comparatively flexible tabs 11. Each flexible tab 11 is shown with an aperture positioned therethrough to receive a screw or other attachment means, and is attached to the frame at less than all four sides (as shown, at only one end) enhancing the flexibility of the tab 11.

A main purpose of the bend resistant frame 10' with comparatively flexible tabs 11 is to provide for improved product performance from a visual perspective when used with either poor installation practices or poor structural install situations. In many applications a wall plate—or mounting frame in this situation—has a tendency to sink in the center area as the screws for wall attachment are tightened. This sinking or pulling of the frame into the wall becomes a visual and aesthetic defect especially under the following two conditions: 1) when the mounting screws for attachment to the wall are over torqued; and 2) when the existing wall box that the frame or plate is attached to by screw is recessed from the main wall surface. A main function of the flexible tabs 11 is to divert the bending and sinking of the frame 10' strictly to these areas. These tabs 11 are located to immediately surround the openings where the mounting screws would be inserted. As these mounting screws are tightened, only the isolated tabs would pull towards the wall mounting box (not shown). This would provide relief for the remainder of the mounting frame 10' by preventing it from sinking in other areas as well. As a result, any wiring devices mounted within the frame 10' would remain flush to the front surface and not sink with the frame itself. All other aspects of the product function, mounting, and wall plate attachment would work as previously described.

It should be understood that the values used above are only representative values, and other values may be in keeping with the spirit and intention of this disclosure.

While several inventive embodiments have been described and illustrated herein with reference to certain exemplary embodiments, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein (and it will be understood by one skilled in the art that various changes in detail may be effected therein without departing from the spirit and scope of the invention as defined by claims that can be supported by the written description and drawings). More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Further, where exemplary embodiments are described with reference to a certain number of elements it will be understood that the exemplary embodiments can be practiced utilizing either less than or more than the certain number of elements.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if not directly attached to where there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A modular electrical wiring device assembly, the modular electrical wiring device assembly comprising: a frame assembly having: a top surface, a bottom surface, a width, a length and a height; a primary opening defined by a primary opening surface, wherein the primary opening is positioned through the top surface and the bottom surface; a cover plate removably positioned over and in contacting relation to the top surface of the frame assembly, wherein the cover plate includes a cover plate opening positioned over and in line with the primary opening; and a modular electrical wiring device having a body with a top user accessible housing portion attached thereto, wherein the modular electrical wiring device is positioned through the cover plate opening and the primary opening, and wherein the frame assembly further includes at least one secondary opening through which a portion of the modular electrical wiring device is positioned through.

2. The modular electrical wiring device assembly of claim 1, further comprising at least one modular alignment connector positioned at least partially within the primary opening in contacting relation with the modular electrical wiring device.

3. The modular electrical wiring device assembly of claim 1, wherein the frame assembly further includes at least one secondary opening through which a portion of the modular alignment connector is positioned through.

4. The modular electrical wiring device assembly of claim 1, wherein a portion of the user accessible housing is positioned below the top surface of the frame assembly.

5. The modular electrical wiring device assembly of claim 4, wherein a portion of the user accessible housing is positioned below the bottom surface of the frame assembly.

6. The modular electrical wiring device assembly of claim 1, further comprising a heat sink connected to the modular electrical wiring device.

7. The modular electrical wiring device assembly of claim 6, wherein a portion of the heat sink is positioned below the top surface of the frame assembly.

8. The modular electrical wiring device assembly of claim 1, wherein the modular electrical wiring device is selected from the group consisting of an electromechanical switch, dimmer, and outlet device.

9. The modular electrical wiring device assembly of claim 1, further comprising at least one flexible tab configured to receive a fastener, wherein a portion of the at least one flexible tab is configured to bend with respect to the remainder of the frame assembly upon an application of a force in a first direction.

10. A modular electrical wiring device assembly, the modular electrical wiring device assembly comprising: a frame assembly having: a top surface, a bottom surface, a width, a length and a height; a primary opening positioned through the top surface and the bottom surface; a cover plate removably positioned over and in contacting relation to the top surface of the frame assembly, wherein the cover plate includes a cover plate opening positioned over and in line with the primary opening; wherein there is no separator structure positioned between the frame assembly and the cover plate; and a modular electrical wiring device having a body with a top user accessible housing portion attached thereto, wherein the modular electrical wiring device is positioned through the cover plate opening and the primary opening, and wherein the frame assembly further includes at least one secondary opening through which a portion of the modular electrical wiring device is positioned through.

11. The modular electrical wiring device assembly of claim 10, further comprising at least one modular alignment connector positioned at least partially within the primary opening in contacting relation with the modular electrical wiring device.

12. The modular electrical wiring device assembly of claim 10, wherein the frame assembly further includes at least one secondary opening through which a portion of the modular alignment connector is positioned through.

13. The modular electrical wiring device assembly of claim 10, wherein a portion of the user accessible housing is positioned below the top surface of the frame assembly.

14. The modular electrical wiring device assembly of claim 13, wherein a portion of the user accessible housing is positioned below the bottom surface of the frame assembly.

15. The modular electrical wiring device assembly of claim 10, further comprising a heat sink connected to the modular electrical wiring device.

16. The modular electrical wiring device assembly of claim 15, wherein a portion of the heat sink is positioned below the top surface of the frame assembly.

17. The modular electrical wiring device assembly of claim 10, wherein the modular electrical wiring device is selected from the group consisting of an electromechanical switch, dimmer, and outlet device.

18. The modular electrical wiring device assembly of claim 10, wherein the outlet device includes an electrical outlet or a USB port.

19. The modular electrical wiring device assembly of claim 10, further comprising at least one flexible tab configured to receive a fastener, wherein a portion of the at least one flexible tab is configured to bend with respect to the remainder of the frame assembly upon an application of a force in a first direction.

20. A modular electrical wiring device assembly, the assembly comprising: a frame assembly having: a top surface, a bottom surface, a width, a length and a height; a primary opening defined by a primary opening surface, wherein the primary opening is positioned through the top surface and the bottom surface; a cover plate removably positioned over and in contacting relation to the top surface of the frame assembly, wherein the cover plate includes a cover plate opening positioned over and in line with the primary opening; and a modular electrical wiring device having a body with a top user accessible housing portion attached thereto, wherein the modular electrical wiring device is positioned through the cover plate opening and the primary opening, wherein a portion of the user accessible housing is positioned below the top surface of the frame assembly, and wherein the frame assembly further includes at least one secondary opening through which a portion of the modular electrical wiring device is positioned through.

21. The modular electrical wiring device assembly of claim 20, further comprising at least one flexible tab configured to receive a fastener, wherein a portion of the at least one flexible tab is configured to bend with respect to the remainder of the frame assembly upon an application of a force in a first direction.

\* \* \* \* \*